UNITED STATES PATENT OFFICE.

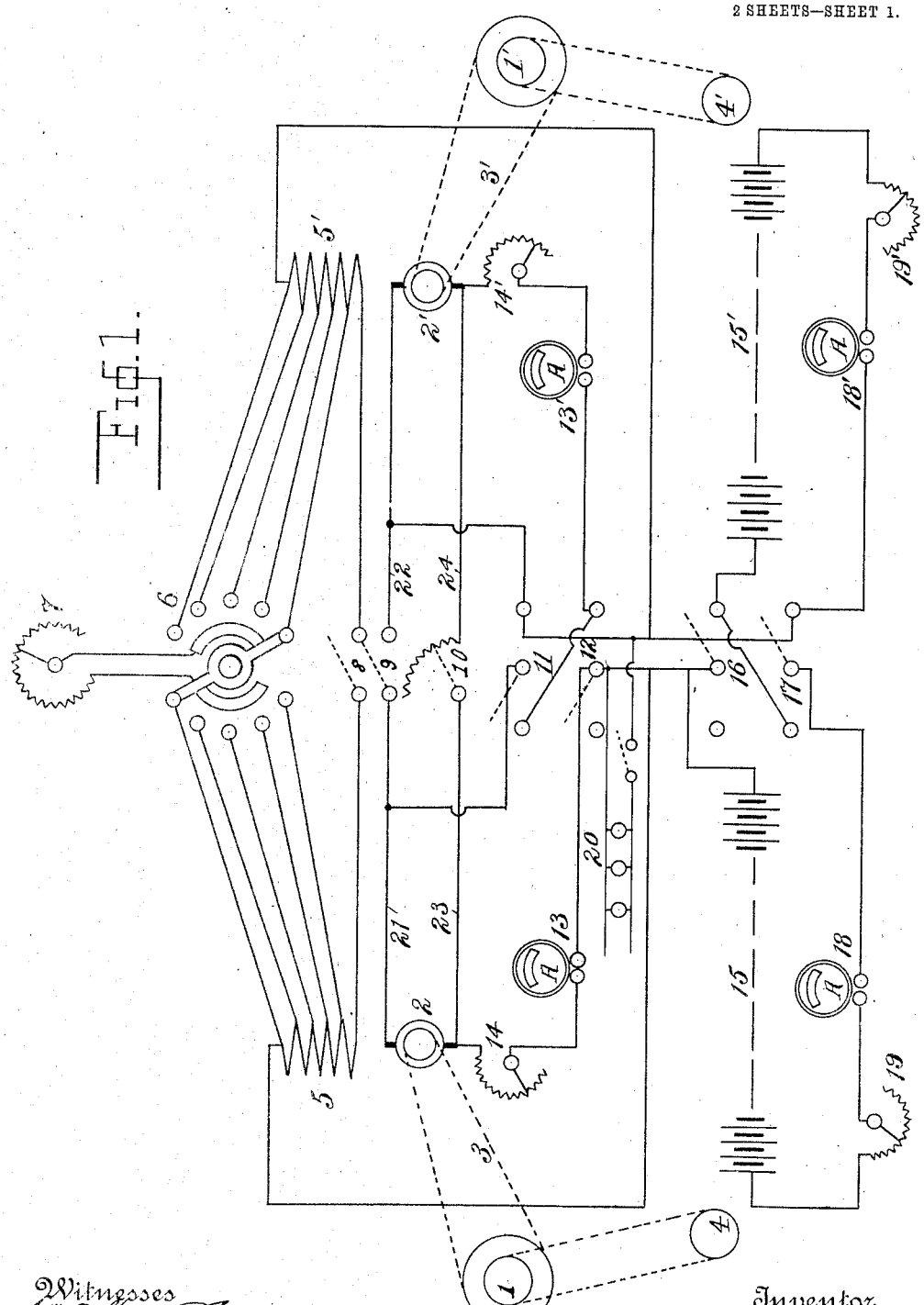

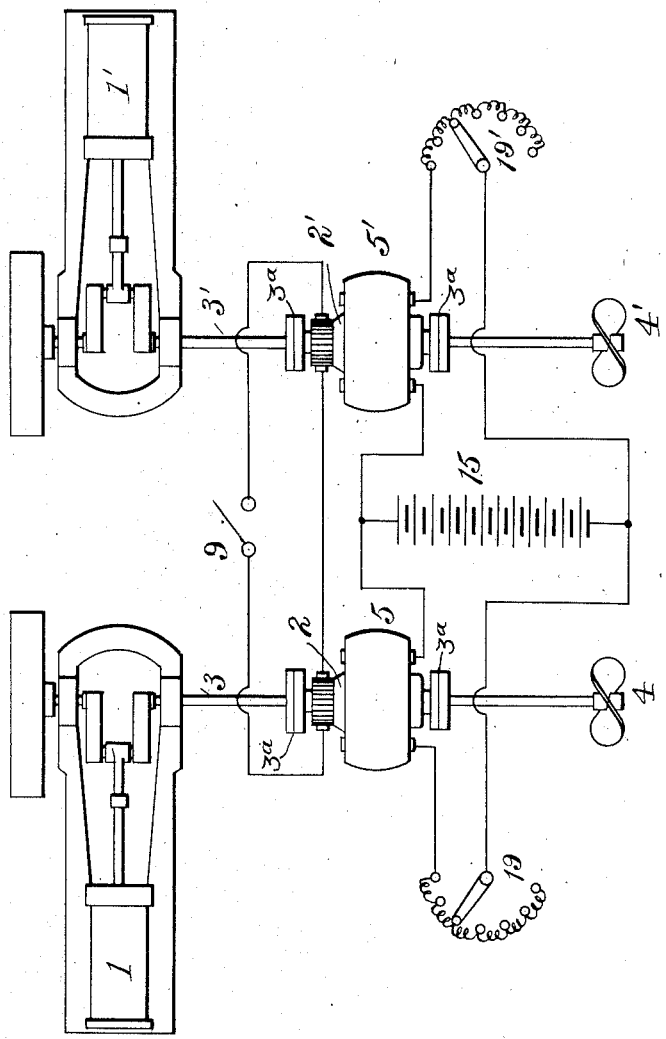

ALBERT S. HUBBARD, OF GREENWICH, CONNECTICUT, ASSIGNOR TO GOULD STORAGE BATTERY COMPANY, A CORPORATION OF NEW YORK.

SYSTEM OF ELECTRICAL DISTRIBUTION.

No. 885,754.            Specification of Letters Patent.        Patented April 28, 1908.

Application filed January 19, 1903. Serial No. 139,589.

*To all whom it may concern:*

Be it known that I, ALBERT S. HUBBARD, a citizen of the United States, residing at Greenwich, in the county of Fairfield, State of Connecticut, have invented certain new and useful Improvements in Systems of Electrical Distribution, of which the following is a specification.

This invention relates to improvements in systems of distribution, and particularly to a generating, storing and distributing system involving the use of one or more prime movers, means for utilizing the power of the prime movers for mechanical power or for the conversion of this power into electrical energy, the storing of this electrical energy as chemical energy in storage batteries, and the re-conversion of this chemical energy into electrical energy and mechanical power, while regulating the speed of the prime movers automatically and compensating for variations of speed in the prime movers.

In the accompanying drawings, Figure 1 represents in diagram a system or installation embodying my invention. Fig. 2 represents also diagrammatically one embodiment of my invention in simple form.

Referring to Fig. 1, 1, 1' represents two prime movers operatively connected to the dynamos 2, 2' by belting 3, 3', though clutches, as shown at 3ª Fig. 2 or gearing, chain and sprocket, or direct connection may be used. 4, 4' represent means for utilizing power from the prime movers. 5, 5' represents the field of the dynamos 2, 2'. 6 and 7 are the controllers for the dynamo fields 5, 5'. 8 is a switch for the dynamo fields. By means of controllers 6 and 7 and switch 8 the fields of the dynamo machines may be adjusted and regulated to give any desired relative degree of field strength. 9 and 10 are switches for connecting the two dynamo armatures together. 11 and 12 are switches for connecting the dynamo armatures in parallel or series and for cutting one or both armatures out of circuit. 13 and 13' are ampere-meters, one in each dynamo circuit. 14, 14' are rheostats for the control of the current from the dynamo machines 2, 2' as generators, or into them as motors. 15 and 15' are storage batteries. 16 and 17 are switches to connect the two batteries in parallel or in series, or to cut either or both batteries out of circuit. 18, 18' are ampere-meters for indicating the output or input of each battery. 19, 19' are rheostats for controlling the output or input of each battery.

The arrangement of the apparatus is such that either or both prime movers 1, 1' can supply power to its respective device 4, 4', and if desired, can also supply electric energy from the dynamos 2, 2', which energy can be utilized directly in a power circuit 20 or in either or both of the storage batteries 15, 15' or the dynamos 2, 2' may be used as motors receiving power from the storage batteries, which power can be utilized on the devices 4, 4', either alone or in connection with power from the prime movers 1, 1'. While at the same time the dynamos will tend to regulation of speed of the prime movers, so that both can be run at the same speed or at different speeds. Assume both prime movers 1, 1' to be running and supplying power to the devices 4, 4', which require steady speed, with gas engines and many other prime movers the relative speeds will be to a great extent dependent on the loads on 4 and 4', so that with the loads on 4 and 4' equal, the speeds of 1 and 1' might be the same; for an increase of load on 4 and a corresponding decrease of load on 4', the speed of 1 would be decreased while the speed of 1' would be increased. If now we attach to 1 and 1' dynamo machines 2 and 2' and connect their armatures together by the conductors 21, 23, 22, 24 and the switch 9 and rheostat 10, and excite the fields 5 and 5' from a separate source such as the storage battery 15, 15', so that the positive and negative of dynamo 2 are connected to positive and negative of dynamo 2' with similar armatures and similar fields and field strengths, an increase in speed of one machine will cause that machine to force current into the other and drive it as a motor, bringing the speed of the latter up to approximately its normal, and by adjustment of the relative field strengths the relative speeds of the two prime movers may be kept practically constant at any point desired. For instance, with similar field and armatures in the dynamos, the speed of 1 and 1' might be, say 300 R. P. M. which speed would be maintained practically constant, and by adjustment of the field strengths the speed of say 1 might be 100 R. P. M. and 1' 200 R. P. M., which speeds would be maintained practically constant. Energy from the dynamos in parallel may be used in the consumption circuit 20, or in charging the storage batteries 15, 15' while the dynamos are used as speed regulators. Or energy may be taken from the storage battery to drive the dynamos as motors; at the same time they are being used as speed regulators. By means of the resistances 19, 19' and the switches 16, 17 the amount of battery counter E. M. F. may be adjusted to the dynamo voltage, while the latter may be regulated by the regulators 6 and 7.

While the fields 5, 5' are shown in the drawing, Fig. 1, in series with a commutating regulator and shunt, 6 and 7, it will be understood that any suitable one of the well known methods of field regulation may be used.

The switches 11 and 12 are used to connect the dynamos 2, 2' in parallel for ordinary working, and in series for starting them as motors, or for obtaining a higher E. M. F. for charging the batteries or for any purpose where an E. M. F. or counter E. M. F. higher than the normal is desired.

The rheostat 10 is used to vary the amount of speed regulation by limiting the current transferred from one dynamo to the other under variations of speed.

Fig. 2 shows a practical application of the system omitting some of the circuit details of Fig. 1 and showing the invention applied to the regulation of two engines 1, 1' driving shafts of screws 4, 4', the shafts also bearing the dynamo-armatures 2, 2'.

Having thus described my invention, what I claim as new therein and desire to secure by Letters Patent is:

1. The combination of a plurality of prime movers, direct current dynamo-electric machines connected therewith to regulate the speed of said prime movers, and connections between the armatures of said dynamo machines whereby differences in speed in the prime movers are automatically compensated.

2. The combination of a plurality of prime movers, direct current dynamo-electric machines connected therewith to regulate the speed of said prime movers, and connections between the armatures of said dynamo machines whereby the energy generated by the relative increase of speed of one prime mover is automatically applied to increase the speed of another prime mover.

3. The combination of a plurality of prime movers, a corresponding plurality of dynamo-electric machines connected to the prime movers to regulate the speed of the same, and means to adjust the regulation whereby the prime movers may be regulated to run at the same or different relative speeds.

4. The combination of a plurality of prime movers, a corresponding plurality of energy-consumption devices connected thereto, a corresponding plurality of dynamo-electric machines connected to the prime movers to regulate the speed of the same, and means to adjust the regulation whereby the prime movers may be regulated to run at the same or different relative speeds.

5. The combination of a plurality of prime movers, a corresponding plurality of energy-consumption devices connected thereto, a corresponding plurality of dynamo-electric machines connected to regulate the speed of the energy-consumption devices, and means to adjust the regulation whereby the energy-consumption devices may be regulated to run at the same or different relative speeds.

6. The combination of a plurality of prime movers dynamo-electric machines having driving connection therewith, a plurality of energy-consumption devices for utilizing the energy of the prime movers, and connections between the dynamo-machines whereby differences in speed of the energy-consumption device may be automatically compensated.

7. The combination of a plurality of prime movers, energy consumption devices driven thereby, dynamo electric machines having driving connection with the prime movers and means for causing the transfer of energy from one dynamo electric machine to another.

8. The combination with a plurality of prime movers and energy consumption devices connected thereto, of dynamo electric machines having driving connection with the prime movers, the armatures of the dynamo electric machines connected to cause a transfer of energy from one dynamo machine to another, and means for varying the amount of energy transferred.

9. The combination of a plurality of prime movers, energy consumption devices connected thereto, dynamo electric machines connected to the prime movers and to the energy consumption devices, a source of power for energizing the fields of the dynamo electric machines, means for varying the field strength of the dynamo electric machines, a storage battery and charging circuit therefor, means for connecting the storage battery with the dynamos for charging, means for regulating the amount of charge, means for indicating the amount of charging current, means to cause the dynamo electric machines to regulate the speed of the prime movers, and means to vary the amount of this regulation.

10. The combination of a plurality of prime movers, direct current dynamo-electric machines connected thereto, connections between the armatures of said dynamo-machines to equalize the speed of the prime movers, and a source of current for energizing the fields of the dynamo-electric machines.

11. The combination of a plurality of prime movers, dynamo-electric machines connected thereto to regulate the speed of the prime movers, electrical connection between the dynamo-machines, and an adjustable resistance interposed in said connection.

12. The combination of a plurality of prime movers and energy consumption devices connected thereto, of dynamo electric machines having separately excited fields and means to connect the armatures in parallel to cause a transfer of energy from one dynamo electric machine to the other upon change of speed of the prime movers.

13. The combination of a plurality of prime movers and energy consumption devices connected thereto, of dynamo electric machines having separately excited fields, and means to connect the armatures in parallel to cause a transfer of energy from one dynamo electric machine to the other upon change of speed of the energy consumption devices.

14. The combination of two prime movers and an energy consumption device connected to each prime mover, a dynamo electric machine connected to each prime mover, a consumption circuit for the dynamo electric machines, means for causing one dynamo electric machine to supply power to the other upon changes of relative speeds, and a storage battery to absorb the excess power of the dynamo electric machines and having connection with the fields of the dynamo-machines to energize the same.

15. The combination of two prime movers, an energy consumption device and a dynamo electric machine connected to each prime mover, a consumption circuit for the dynamo electric machine, means for causing one dynamo electric machine to supply power to the other upon changes of relative speeds, and a storage battery to supply additional energy to the dynamo electric machines.

16. The combination of two prime movers, an energy consumption device and a dynamo electric machine connected to each prime mover, a consumption circuit, a storage battery to supply energy to the dynamo electric machines, and means for causing the energy supplied from the storage battery to the dynamo electric machines to vary in accordance with changes in relative speeds of the prime movers.

17. The combination of a plurality of prime movers, a corresponding plurality of dynamo electric machines having driving connection therewith, a storage battery connected to said dynamo electric machines to receive energy therefrom or deliver energy thereto, and means for connecting the armatures of said dynamo electric machines in series or in parallel.

ALBERT S. HUBBARD.

Witnesses:
J. GREEN,
HARRY E. KNIGHT.